No. 789,659. PATENTED MAY 9, 1905.
L. KANTOROWICZ.
PROCESS OF MARKING LEAVES.
APPLICATION FILED JAN. 23, 1905.
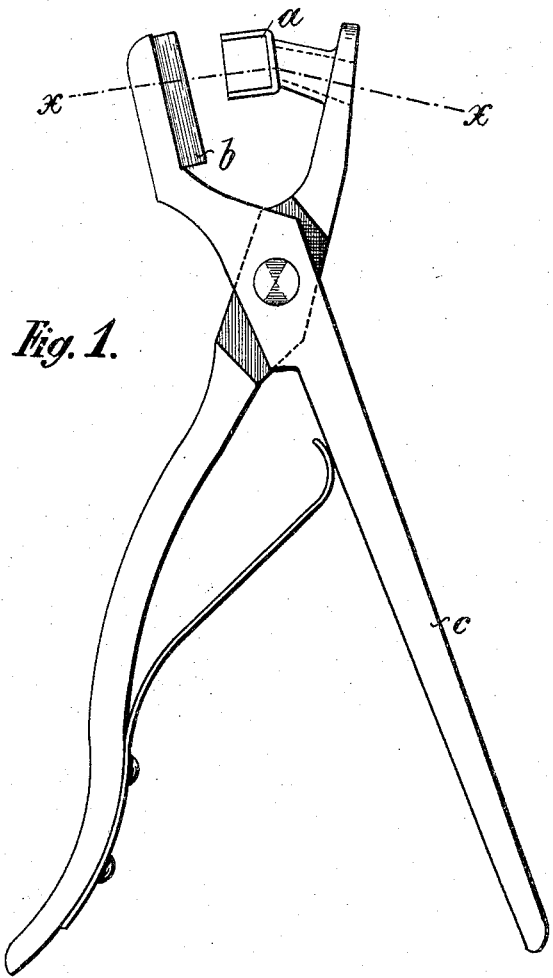
Fig. 1.
Fig. 2.
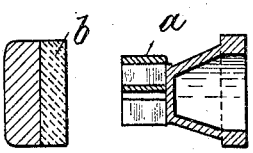
Witnesses
Am. Kuhne
John A. Percival
Inventor
Ludwig Kantorowicz
By Richards
Attorneys

UNITED STATES PATENT OFFICE.

LUDWIG KANTOROWICZ, OF POSEN, GERMANY.

PROCESS OF MARKING LEAVES.

SPECIFICATION forming part of Letters Patent No. 789,659, dated May 9, 1905.

Application filed January 23, 1905. Serial No. 242,450.

*To all whom it may concern:*

Be it known that I, LUDWIG KANTOROWICZ, a citizen of Prussia, residing in the city of Posen, Province of Posen, Kingdom of Prussia, in the Empire of Germany, have invented new and useful Improvements in Processes of Marking Leaves, of which the following is a specification.

The object of the present invention is a process to mark leaves of flowers and plants of any kind with letters, words, designs, and the like in such a manner that the life of the leaves will not be destroyed.

It has been known for a long time to impress colored marks on leaves by printing with a common printing-press. On watering the flowers that kind of print is quickly wiped out, so that it cannot be read distinctly any longer. Other processes to impress leaves with marks by etching or burning have the great drawback that the substance of the leaf is destroyed in the places marked, whereby the life of the leaf is greatly endangered. The process to be described below avoids all those drawbacks in a most effectual manner.

I have found that if leaves of plants be subjected to the action of heat a distinct alteration of the coloration of the leaf takes place. If the heating is performed in certain places of the leaf, the alteration of the color of course only sets in locally, and that observation forms the basis of the present process to impress marks on the surface of leaves without interfering with the life of the leaves in any way. The temperature up to which the leaf to be treated should be heated varies to some extent and depends upon the nature of the leaf. With leaves of a thin texture, such as leaves of the oak-tree or plane-tree, and so on, the alteration of the color is very distinct if the leaves are locally heated up to 70° centigrade, whereas the leaves of palm-trees, which have a thicker texture, must be heated to 90° centigrade and even higher. It is always best to ascertain the most suitable temperature by a few preliminary experiments. It needs scarcely be pointed out that in no case the heat must be raised so high as to cause a scorching or burning of the leaf, whereby the effect desired would of course be altogether missed. For instance, if the green leaf of a rose-tree be taken and locally heated to about 70° centigrade it will be found that in that place the green color of the leaf becomes lighter, and the difference in color is so very distinct that marks or words impressed in that way can be well read.

For carrying out the process in practice any apparatus will do that allows of a local heating. A contrivance that has given good results is illustrated in the accompanying drawings, in which—

Figure 1 is a side view of the contrivance, and Fig. 2 a section on the line $x\,x$ of Fig. 1.

The apparatus consists of a pair of tongs $c$, one cheek of which carries a pad $b$, whereas the other cheek, $a$, is provided with a punch, which in reversed letters contains the marks or words that are to be impressed on the plants. Those parts of the punch that come into contact with the surface of the leaf must be thin and sharp enough to cause only a local heating of the plant. The heating of the punch can be done by any means well known.

The invention is not only applicable to green leaves of plants, but also to leaves of flowers; but in that case the local heating should be performed with the greatest care, as otherwise the thin leaves of flowers are apt to roll up.

Having now particularly described and ascertained the nature of the said invention and in what manner the same is to be performed, I declare that what I claim is—

A process for marking leaves of plants and flowers with letters, designs and the like consisting in impressing them on the leaves to be marked with a heated punch or some similar contrivance in order to produce a local heating of the leaves, which causes a local alteration of the coloring of the leaves without destroying the life of the leaves.

In testimony whereof I have signed my name to this specification in the presence of two subscribing witnesses.

LUDWIG KANTOROWICZ.

Witnesses:
 LUDWIG LEHMANN,
 PAUL KRUGER.